US012657226B2

(12) United States Patent
Chen et al.

(10) Patent No.: US 12,657,226 B2
(45) Date of Patent: Jun. 16, 2026

(54) METHOD FOR ANALYZING DOCUMENT FOR DESIRED CONTENT AND EXRACTING SAME, ELECTRONIC DEVICE EMPLOYING METHOD, AND NON-TRANSITORY STORAGE MEDIUM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jian-Cai Chen, Wuhan (CN); Jun-Cong Gong, Wuhan (CN); Guang-Lin Hu, Wuhan (CN); Hou-Yuan Chou, New Taipei (TW)

(73) Assignees: HONG FU JIN PRECISION INDUSTRY (WuHan) CO., LTD., Wuhan (CN); HON HAI PRECISION INDUSTRY CO., LTD, New Taipei (TW)

( * ) Notice: Subject to any disclaimer, the term of this patent is extended or adjusted under 35 U.S.C. 154(b) by 444 days.

(21) Appl. No.: 18/138,027

(22) Filed: Apr. 21, 2023

(65) Prior Publication Data

US 2023/0342385 A1      Oct. 26, 2023

(30) Foreign Application Priority Data

Apr. 26, 2022    (CN) .......................... 202210451702.6

(51) Int. Cl.
*G06F 16/93*        (2019.01)
*G06F 16/3332*      (2025.01)
(Continued)

(52) U.S. Cl.
CPC ........ *G06F 16/345* (2019.01); *G06F 16/3334* (2019.01); *G06F 16/35* (2019.01)

(58) Field of Classification Search
CPC ...... G06F 16/93; G06F 40/106; G06F 16/345; G06F 16/248; G06F 40/30; G06F 40/279;
(Continued)

(56) References Cited

U.S. PATENT DOCUMENTS 5,987,457 A * 11/1999 Ballard ............... G06F 16/9535
                                                    707/999.005
10,963,627 B2 * 3/2021 N ........................... G06F 40/20
(Continued)

FOREIGN PATENT DOCUMENTS

CN          110377558 A * 10/2019 ........... G06F 16/148

*Primary Examiner* — Olujimi A Adesanya
(74) *Attorney, Agent, or Firm* — ScienBiziP, P.C.

(57)              ABSTRACT

A method for extracting text relevant to a particular topic from a document to generate a narrower, condensed, more specific, and smaller version obtains information as to the text of a large document and searches the text information of the document based on first keywords to extract first pages. The first pages are inputted into a predetermined learning model to extract second keywords from the first pages, and the first keywords and the second keywords are integrated to obtain third keywords. The method further searches the text of the first pages based on the third keywords to extract second pages and a determination is made as to whether the second pages meet a predetermined page standard. If yes, the second pages are integrated and output. An electronic device and a non-transitory storage medium are also disclosed.

13 Claims, 4 Drawing Sheets

(51) Int. Cl.
    *G06F 16/34*        (2019.01)
    *G06F 16/35*        (2019.01)

(58) Field of Classification Search
    CPC .............. G06F 40/103; G06F 16/3344; G06F
                 16/9038; G06F 40/35; G06F 40/56
    See application file for complete search history.

(56)              References Cited

U.S. PATENT DOCUMENTS

| | | | |
|---|---|---|---|
| 11,914,663 B2 * | 2/2024 | Chai ................... | G06F 16/9558 |
| 2007/0214112 A1 * | 9/2007 | Towers ................. | G06F 16/338 |
| 2019/0213465 A1 * | 7/2019 | Avrahami ............. | G10L 15/197 |
| 2022/0284067 A1 * | 9/2022 | Liu ..................... | G06F 16/9535 |
| 2022/0382975 A1 * | 12/2022 | Gu ........................ | G06F 40/216 |
| 2022/0405503 A1 * | 12/2022 | Kaza ................... | G06V 10/774 |
| 2023/0027310 A1 * | 1/2023 | Muralidharan ....... | G06F 40/166 |
| 2023/0124176 A1 * | 4/2023 | Lu ....................... | G06F 16/3331 |
| | | | 707/769 |
| 2023/0205779 A1 * | 6/2023 | Khambholja ......... | G06F 40/205 |
| | | | 707/602 |

\* cited by examiner

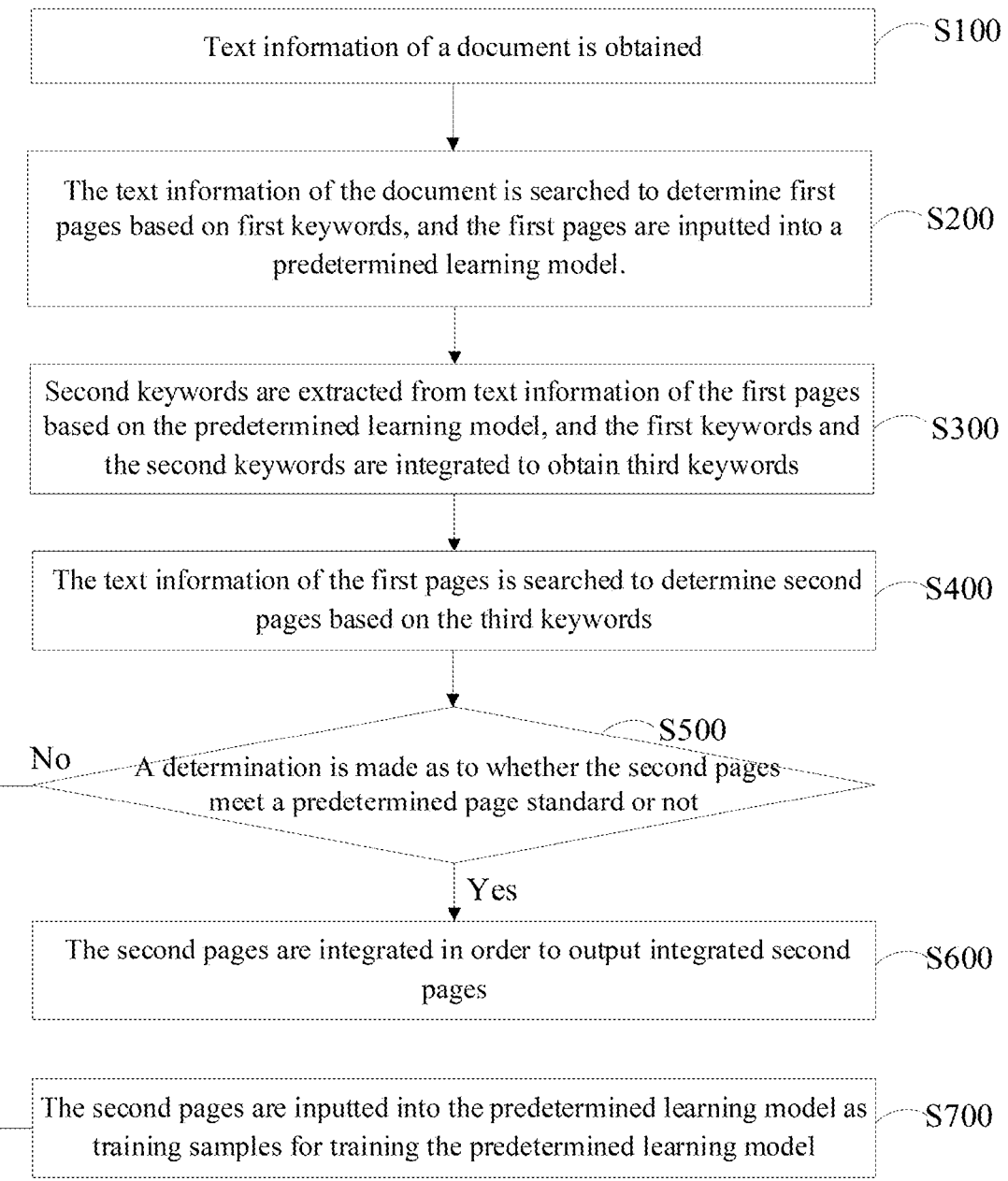

| Text information of a document is obtained | S100 |

| The text information of the document is searched to determine first pages based on first keywords, and the first pages are inputted into a predetermined learning model. | S200 |

| Second keywords are extracted from text information of the first pages based on the predetermined learning model, and the first keywords and the second keywords are integrated to obtain third keywords | S300 |

| The text information of the first pages is searched to determine second pages based on the third keywords | S400 |

No

A determination is made as to whether the second pages meet a predetermined page standard or not      S500

Yes

| The second pages are integrated in order to output integrated second pages | S600 |

| The second pages are inputted into the predetermined learning model as training samples for training the predetermined learning model | S700 |

FIG. 1

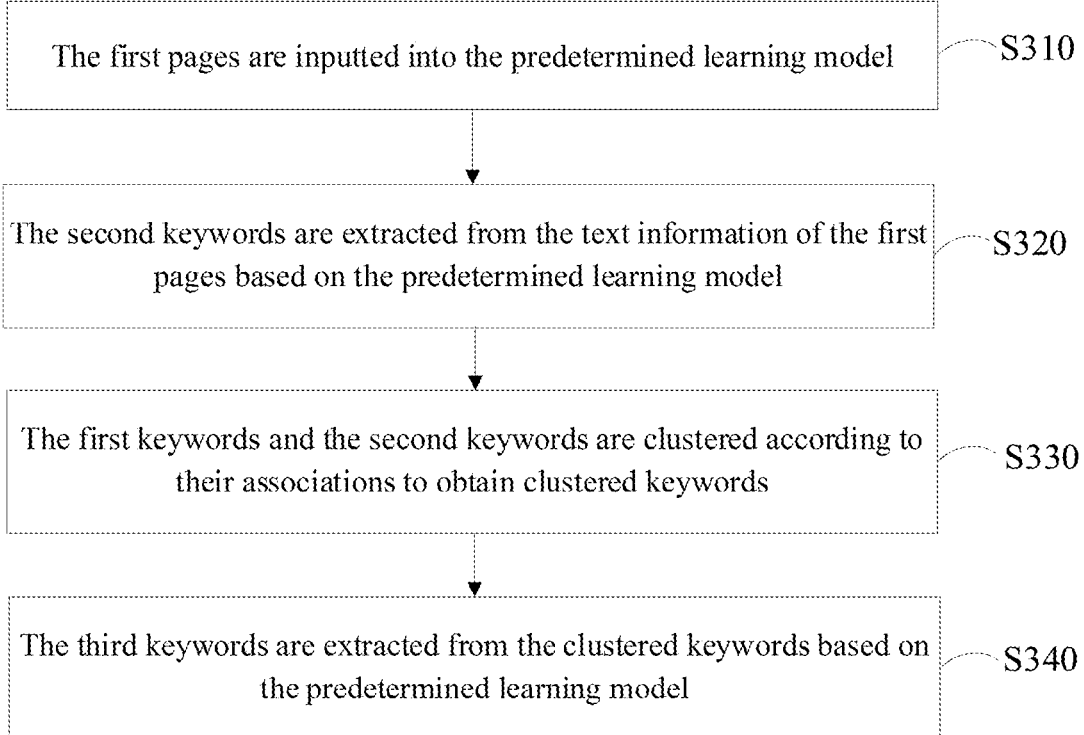

The first pages are inputted into the predetermined learning model —S310

The second keywords are extracted from the text information of the first pages based on the predetermined learning model —S320

The first keywords and the second keywords are clustered according to their associations to obtain clustered keywords —S330

The third keywords are extracted from the clustered keywords based on the predetermined learning model —S340

FIG. 2

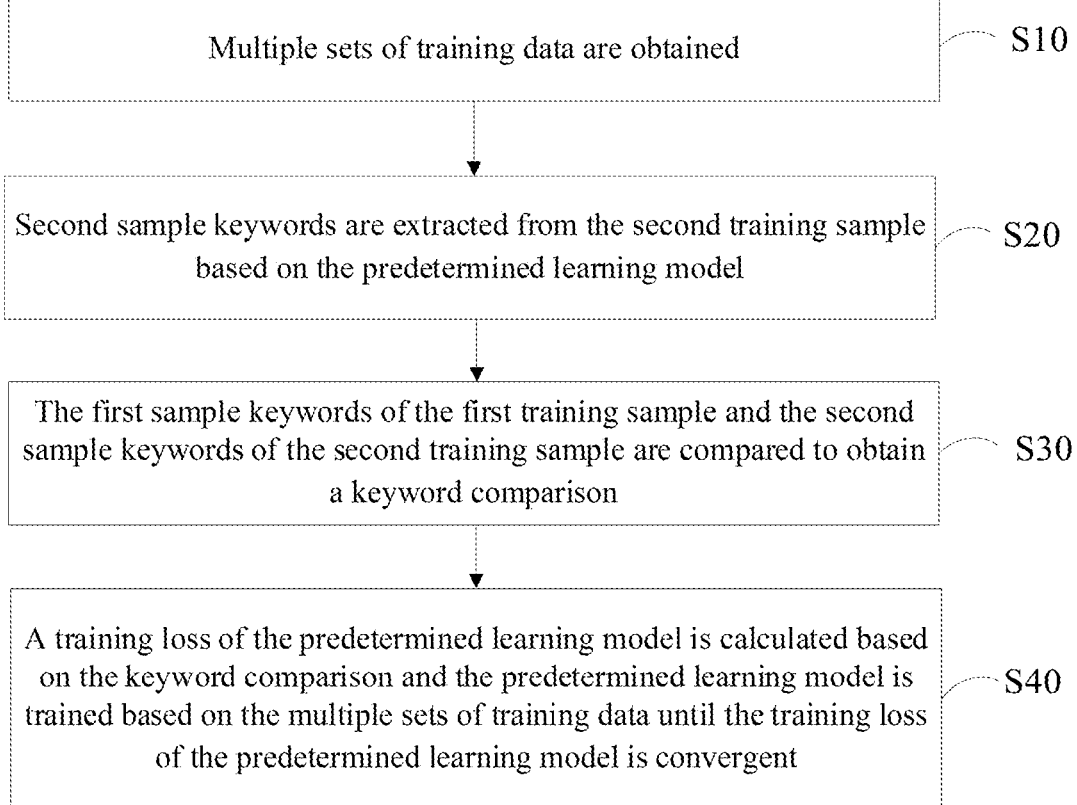

Multiple sets of training data are obtained — S10

Second sample keywords are extracted from the second training sample based on the predetermined learning model — S20

The first sample keywords of the first training sample and the second sample keywords of the second training sample are compared to obtain a keyword comparison — S30

A training loss of the predetermined learning model is calculated based on the keyword comparison and the predetermined learning model is trained based on the multiple sets of training data until the training loss of the predetermined learning model is convergent — S40

FIG. 3

METHOD FOR ANALYZING DOCUMENT FOR DESIRED CONTENT AND EXRACTING SAME, ELECTRONIC DEVICE EMPLOYING METHOD, AND NON-TRANSITORY STORAGE MEDIUM

TECHNICAL FIELD

The subject matter herein generally relates to document processing.

BACKGROUND

Some documents may contain a large number of pages, such as a technical document of a portable document format (PDF) format, users may only be interested in content occupying a smaller number of pages. Extracting contents of interest to users from the document to generate a narrow and specific version of the document is problematic.

BRIEF DESCRIPTION OF THE DRAWINGS

Implementations of the present technology will now be described, by way of example only, with reference to the attached figures.

FIG. 1 is a flowchart of an embodiment of a text extraction method according to the present disclosure.

FIG. 2 is a flowchart of subdivisions of S300 of FIG. 1 in the method according to FIG. 1.

FIG. 3 is a flowchart of an embodiment of a method for training a predetermined learning model for text extraction according to the present disclosure.

DETAILED DESCRIPTION

Figure 4:
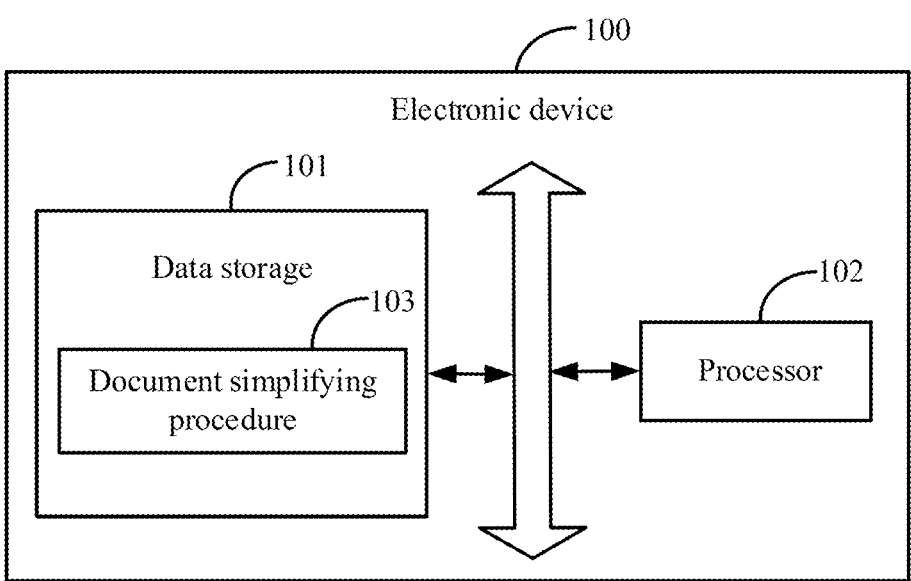
FIG. 4 is a block diagram of an embodiment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

Unless defined otherwise, all technical or scientific terms used herein have the same meaning as those normally understood by technicians in the technical field. The following technical terms are used to describe the application, the description is not to be considered as limiting the scope of the embodiments herein.

FIG. 1 illustrates one exemplary embodiment of a method for extracting text from a document. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be operated in an electronic device and begin at block S100.

In block S100, text information of a document is obtained.

In one embodiment, the document can be a portable document format (PDF) document, or other file format document.

information as to text of the document can be obtained. For example, the document is a PDF document, the PDF document can be converted to an intermediate format document according to a current PDF recognition tool, the intermediate format may be a hyper text markup language (HTML) format, an extensible markup language (XML) format, a document (DOC) format, etc.. The text information of the document can be obtained from the intermediate format document.

In one embodiment, the text information of the document may comprise texts, tables, pictures, etc.

In block S200, the text information of the document is searched to determine first pages based on first keywords, and the first pages are inputted into a predetermined learning model.

In one embodiment, a predetermined number of first keywords can be defined by a user. For example, the user may define the first keywords according to the desired content.

In one embodiment, the predetermined number of first keywords can be combined to a search strategy by a logical OR operation (and/or a logical AND operation) to search the text information of the document. For example, the document is a technical document at least partly related to main board design, and the user can define ten keywords related to printed circuit board (PCB) routing to form a search strategy to search the text information of the document.

When the first pages are located by the first keywords, the first pages can be extracted and inputted into the predetermined learning model to perform a correlation.

In block S300, second keywords are extracted from text information of the first pages based on the predetermined learning model, and the first keywords and the second keywords are integrated to obtain third keywords.

In one embodiment, the predetermined learning model can record the first keyword inputted by the user, to learn keyword extraction of the first pages, to extract the second keywords. The first keywords and the second keywords can be integrated to generate the third keywords by the predetermined learning model. For example, the first keywords and the second keywords can be merged and duplicate keywords removed.

In one embodiment, the third keywords can comprise structure keywords and/or table content keywords.

In block S400, the text information of the first pages is searched to determine second pages based on the third keywords.

In one embodiment, the text information of the first pages is searched based on the third keywords to locate the second pages and the second pages can thus be extracted.

In block S500, a determination is made as to whether the second pages meet a predetermined page standard or not.

In one embodiment, the second pages can be determined as meeting the predetermined page standard or not according to keywords defined by the user. For example, each of the second pages is determined to meet the predetermined page standard or not according to the number of first keywords contained therein.

In block S600, the second pages are integrated in order to output integrated second pages when the second pages meet the predetermined page standard.

In block S600, the second pages are integrated in order to output integrated second pages when the second pages meet the predetermined page standard.

In one embodiment, when the second pages meet the predetermined page standard, a calculation as to relevance of the second pages can be performed to obtain relevance coefficients of the second pages. The second pages can be integrated in order of the relevance coefficients, from the largest to the smallest, to output the integrated second pages.

In block S700, the second pages are inputted into the predetermined learning model as training samples for training the predetermined learning model if the second pages do not meet the predetermined page standard.

In one embodiment, when the second pages do not meet the predetermined page standard, the second pages can be inputted into the predetermined learning model as the training samples for training the predetermined learning model. For example, the second pages can be screenshot or labeled training feature by a user, as the training samples for training the predetermined learning model, to improve model performance.

Referring to FIG. 2, the block S300 may comprise multiple subblocks.

In subblock S310, the first pages are inputted into the predetermined learning model.

In subblock S320, the second keywords are extracted from the text information of the first pages based on the predetermined learning model.

In subblock S330, the first keywords and the second keywords are clustered according to their associations to obtain clustered keywords.

In subblock S340, the third keywords are extracted from the clustered keywords based on the predetermined learning model.

FIG. 3 illustrates one exemplary embodiment of a method for training the predetermined learning model. The example method can be begin at block S10.

In block S10, multiple sets of training data are obtained.

In one embodiment, each of the multiple sets of training data comprises a first training sample, a second training sample, and first sample keywords of the first training sample.

In block S20, second sample keywords are extracted from the second training sample based on the predetermined learning model.

In block S30, the first sample keywords of the first training sample and the second sample keywords of the second training sample are compared to obtain a keyword comparison.

In block S40, a training loss of the predetermined learning model is calculated based on the keyword comparison and the predetermined learning model is trained based on the multiple sets of training data until the training loss of the predetermined learning model is convergent.

The method can automatically extract relevant text information corresponding to keywords, integrate the relevant document pages, to generate a narrower and more specific version of document, which can improve an accuracy of document parsing and save a time and cost of human search, identification, and editing.

Referring to FIG. 4, the electronic device 100 can comprise at least one data storage 101, at least one processor 102, and a document simplifying procedure 103. The electronic device 100 can be a computer, a smart phone, a server, etc.

In one embodiment, the data storage 101 can be set in the electronic device 100, or can be a separate external memory card, such as an SM card (Smart Media Card), an SD card (Secure Digital Card), or the like. The data storage 101 can include various types of non-transitory computer-readable storage mediums. For example, the data storage 101 can be an internal storage system, such as a flash memory, a random access memory (RAM) for the temporary storage of information, and/or a read-only memory (ROM) for permanent storage of information. The data storage 101 can also be an external storage system, such as a hard disk, a storage card, or a data storage medium. The processor 102 can be a central processing unit (CPU), a microprocessor, or other data processor chip that achieves the required functions.

Figure 5:
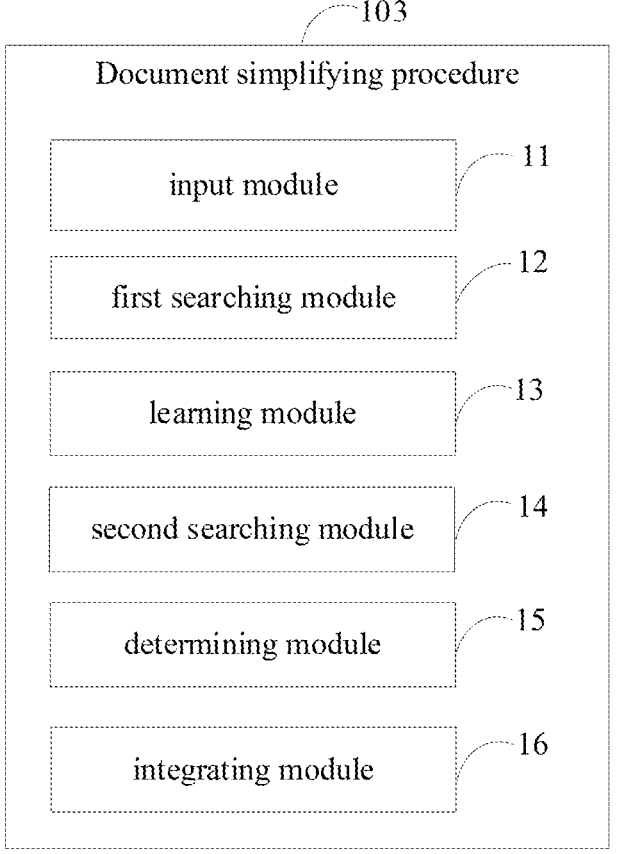
FIG. 5 is a block diagram of an embodiment of a procedure of the method applied by the electronic device of FIG. 4.

FIG. 5 illustrates the document simplifying procedure 103 as comprising a plurality of modules, such as an input module 11, a first searching module 12, a learning module 13, a second searching module 14, a determining module 15, and an integrating module 16. The modules 11-16 can comprise one or more software programs in the form of computerized codes stored in the data storage 101. The computerized codes can include instructions that can be executed by the processor 102 to provide functions for the modules 11-16.

The input module 11 obtains text information of a document.

The first searching module 12 searches the text information of the document based on first keywords to extract first pages, and inputs the first pages into a predetermined learning model.

The learning module 13 extracts second keywords from text information of the first pages based on the predetermined learning model, and integrates the first keywords and the second keywords to obtain third keywords.

The second searching module 14 searches the text information of the first pages based on the third keywords to extract second pages.

The determining module 15 determines whether or not the second pages meet a predetermined page standard.

When the second pages meet the predetermined page standard, the integrating module 16 integrates the second pages in order to output integrated second pages. When the second pages do not meet the predetermined page standard, the second pages can be inputted into the predetermined learning model as the training samples for training the predetermined learning model.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A text extraction method applied to an electronic device, the electronic device being deployed a predetermined learning model and comprising a processor, the method comprising:

obtaining, by the processor, text information of a document;

searching, by the processor, the text information of the document based on first keywords to determine first pages, and inputting, by the processor, the first pages into a predetermined learning model, wherein the predetermined learning model is pretrained with multiple sets of sample documents and keywords extracted from the multiple sets of sample documents, each of the multiple sets of sample documents comprises at least one of texts, tables, and pictures, and the predetermined learning model is loaded and run by the processor;

extracting, by the processor, second keywords from text information of the first pages based on the predetermined learning model, clustering, by the processor, the first keywords and the second keywords according to keyword associations to obtain clustered keywords, and extracting, by the processor, third keywords from the clustered keywords based on the predetermined learning model;

searching, by the processor, the text information of the first pages based on the third keywords to determine second pages;

determining, by the processor, whether the second pages meet a predetermined page standard;

integrating, by the processor, the second pages in order to output integrated second pages when the second pages meet the predetermined page standard; and inputting, by the processor, the second pages into the predetermined learning model as training samples in response to the second pages fail to meet the predetermined page standard, and retraining, by the processor, the predetermined learning model with the training samples.

2. The text extraction method of claim 1, wherein searching the text information of the document based on the first keywords to determine the first pages comprises:

setting a predetermined number of the first keywords, and using a logical OR operation to combine the predetermined number of the first keywords into a search strategy to search the text information of the document to determine the first pages.

3. The text extraction method of claim 1, wherein extracting the second keywords from the text information of the first pages based on the predetermined learning model comprises:

inputting the first pages into the predetermined learning model;

extracting the second keywords from the text information of the first pages based on the predetermined learning model.

4. The text extraction method of claim 1, wherein integrating the second pages in order comprises:

calculating relevance coefficients of the second pages based on the third keywords; and integrating the second pages in order of the relevance coefficients from the largest to the smallest.

5. The text extraction method of claim 1, wherein a training method of the predetermined learning model comprises:

obtaining the multiple sets of sample documents, wherein each of the multiple sets of sample documents comprises a first training sample, a second training sample, and first sample keywords of the first training sample;

extracting second sample keywords from the second training sample based on the predetermined learning model;

comparing the first sample keywords of the first training sample and the second sample keywords of the second training sample to obtain a keyword comparison;

calculating a training loss of the predetermined learning model based on the keyword comparison; and training the predetermined learning model based on the multiple sets of sample documents until the training loss of the predetermined learning model is convergent.

6. The text extraction method of claim 1, wherein the text information of the document comprises texts, tables, or pictures; and the third keywords comprise structure keywords or table content keywords.

7. An electronic device comprising:

at least one processor; and a data storage storing one or more programs which when executed by the at least one processor, cause the at least one processor to:

obtain text information of a document;

search the text information of the document based on first keywords to determine first pages, and input the first pages into a predetermined learning model, wherein the predetermined learning model is pretrained with multiple sets of sample documents and keywords extracted from the multiple sets of sample documents, each of the multiple sets of sample documents comprises at least one of texts, tables, and pictures, and the predetermined learning model is loaded and run by the processor;

extract second keywords from text information of the first pages based on the predetermined learning model, cluster the first keywords and the second keywords according to keyword associations to obtain clustered keywords, and extract third keywords from the clustered keywords based on the predetermined learning model;

search the text information of the first pages based on the third keywords to determine second pages;

determine whether the second pages meet a predetermined page standard;

integrate the second pages in order to output integrated second pages when the second pages meet the predetermined page standard; and input the second pages into the predetermined learning model as training samples in response to the second pages fail to meet the predetermined page standard, and retrain the predetermined learning model with the training samples.

8. The electronic device of claim 7, wherein the at least one processor searching the text information of the document based on the first keywords to determine the first pages comprises:

setting a predetermined number of the first keywords, and using a logical OR operation to combine the predetermined number of the first keywords into a search strategy to search the text information of the document to determine the first pages.

9. The electronic device of claim 7, wherein the at least one processor extracting the second keywords from the text information of the first pages based on the predetermined learning model comprises:

inputting the first pages into the predetermined learning model;

extracting the second keywords from the text information of the first pages based on the predetermined learning model.

10. The electronic device of claim 7, wherein the at least one processor integrating the second pages in order comprises:

calculating relevance coefficients of the second pages based on the third keywords; and integrating the second pages in order of the relevance coefficients from the largest to the smallest.

11. The electronic device of claim 7, wherein a training method of the predetermined learning model trained by the at least one processor comprises:

obtaining the multiple sets of sample documents, wherein each of the multiple sets of sample documents comprises a first training sample, a second training sample, and first sample keywords of the first training sample;

extracting second sample keywords from the second training sample based on the predetermined learning model;

comparing the first sample keywords of the first training sample and the second sample keywords of the second training sample to obtain a keyword comparison;

calculating a training loss of the predetermined learning model based on the keyword comparison; and training the predetermined learning model based on the multiple sets of sample documents until the training loss of the predetermined learning model is convergent.

12. The electronic device of claim 7, wherein the text information of the document comprises texts, tables, or pictures; and the third keywords comprise structure keywords or table content keywords.

13. A non-transitory storage medium having stored thereon instructions that, when executed by a processor of an electronic device, causes the electronic device to perform a text extraction method, the text extraction method comprising:

obtaining, by the processor, text information of a document;

searching, by the processor, the text information of the document based on first keywords to determine first pages, and inputting, by the processor, the first pages into a predetermined learning model, wherein the predetermined learning model is pretrained with multiple sets of sample documents and keywords extracted from the multiple sets of sample documents, each of the multiple sets of sample documents comprises at least one of texts, tables, and pictures, and the predetermined learning model is loaded and run by the processor;

extracting, by the processor, second keywords from text information of the first pages based on the predetermined learning model, clustering, by the processor, the first keywords and the second keywords according to keyword associations to obtain clustered keywords, and extracting, by the processor, third keywords from the clustered keywords based on the predetermined learning model;

searching, by the processor, the text information of the first pages based on the third keywords to determine second pages;

determining, by the processor, whether the second pages meet a predetermined page standard; and integrating, by the processor, the second pages in order to output integrated second pages when the second pages meet the predetermined page standard; and inputting, by the processor, the second pages into the predetermined learning model as training samples in response to the second pages fail to meet the predetermined page standard, and retraining, by the processor, the predetermined learning model with the training samples.

* * * * *